US011030319B2

(12) United States Patent
Doukhvalov et al.

(10) Patent No.: US 11,030,319 B2
(45) Date of Patent: Jun. 8, 2021

(54) METHOD FOR AUTOMATED TESTING OF HARDWARE AND SOFTWARE SYSTEMS

(71) Applicant: AO Kaspersky Lab, Moscow (RU)

(72) Inventors: Andrey P. Doukhvalov, Moscow (RU); Ekaterina A. Rudina, Moscow (RU); Semen S. Kort, Moscow (RU); Viacheslav N. Zolotnikov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 370 days.

(21) Appl. No.: 16/123,093

(22) Filed: Sep. 6, 2018

(65) Prior Publication Data

US 2019/0325144 A1    Oct. 24, 2019

(30) Foreign Application Priority Data

Apr. 19, 2018   (RU) .................. 2018114433

(51) Int. Cl.
    *G06F 21/57*   (2013.01)
    *G06F 11/26*   (2006.01)
    *G06F 11/36*   (2006.01)
    *G06F 21/55*   (2013.01)
    *G06F 30/20*   (2020.01)

(52) U.S. Cl.
    CPC ............ *G06F 21/577* (2013.01); *G06F 11/26* (2013.01); *G06F 11/3664* (2013.01); *G06F 11/3668* (2013.01); *G06F 21/55* (2013.01); *G06F 30/20* (2020.01)

(58) Field of Classification Search
    CPC ........ G06F 21/577; G06F 30/20; G06F 11/26; G06F 11/3664; G06F 21/55; G06F 11/3668; G06F 11/3608; G06F 11/2273; G06F 17/5009; G06F 11/36
    See application file for complete search history.

(56) References Cited

U.S. PATENT DOCUMENTS

| 9,712,551 | B2 * | 7/2017 | Grubel ................. G06F 21/577 |
| 10,867,051 | B2 * | 12/2020 | Doukhvalov ............ G06F 30/20 |
| 2007/0162890 | A1 * | 7/2007 | Meier ................... G06F 21/577 717/100 |
| 2008/0148398 | A1 * | 6/2008 | Mezack ............. H04L 63/1416 726/22 |

(Continued)

OTHER PUBLICATIONS

Swarup Bhunia et al. "Hardware Trojan Attacks: Threat Analysis and Countermeasures" Proceedings of the IEEE, vol. 102, No. 8, Aug. 1, 2014. pp. 1229-1247.

*Primary Examiner* — Christopher A Revak
(74) *Attorney, Agent, or Firm* — Arent Fox LLP; Michael Fainberg

(57) ABSTRACT

Disclosed herein are methods and systems for automated testing of hardware and software systems. An exemplary method comprises receiving a formalized architecture description describing an architecture of a system being designed, receiving a formalized threat description describing threats to systems similar to the system being designed, building, by a processor, a use model based on the formalized description, building, by a processor, a threat model based on the formalized threat description, determining, by a processor, kinds of use of the system by comparing the threat model to the use model and determining, by a processor, components of the system based on the kinds of use.

21 Claims, 9 Drawing Sheets

(56) References Cited

U.S. PATENT DOCUMENTS

| | | | |
|---|---|---|---|
| 2014/0090071 A1 | 3/2014 | Salehie et al. | |
| 2017/0329975 A1 | 11/2017 | Artes et al. | |
| 2019/0052665 A1 | 2/2019 | Mahieu et al. | |
| 2019/0260779 A1* | 8/2019 | Bazalgette | G06N 20/00 |

* cited by examiner

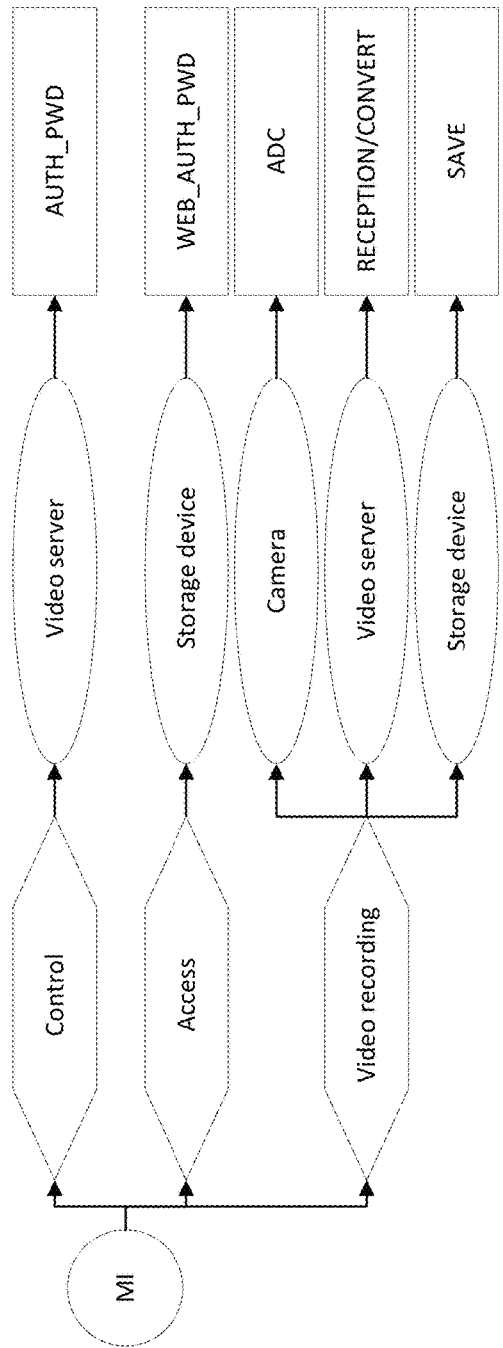
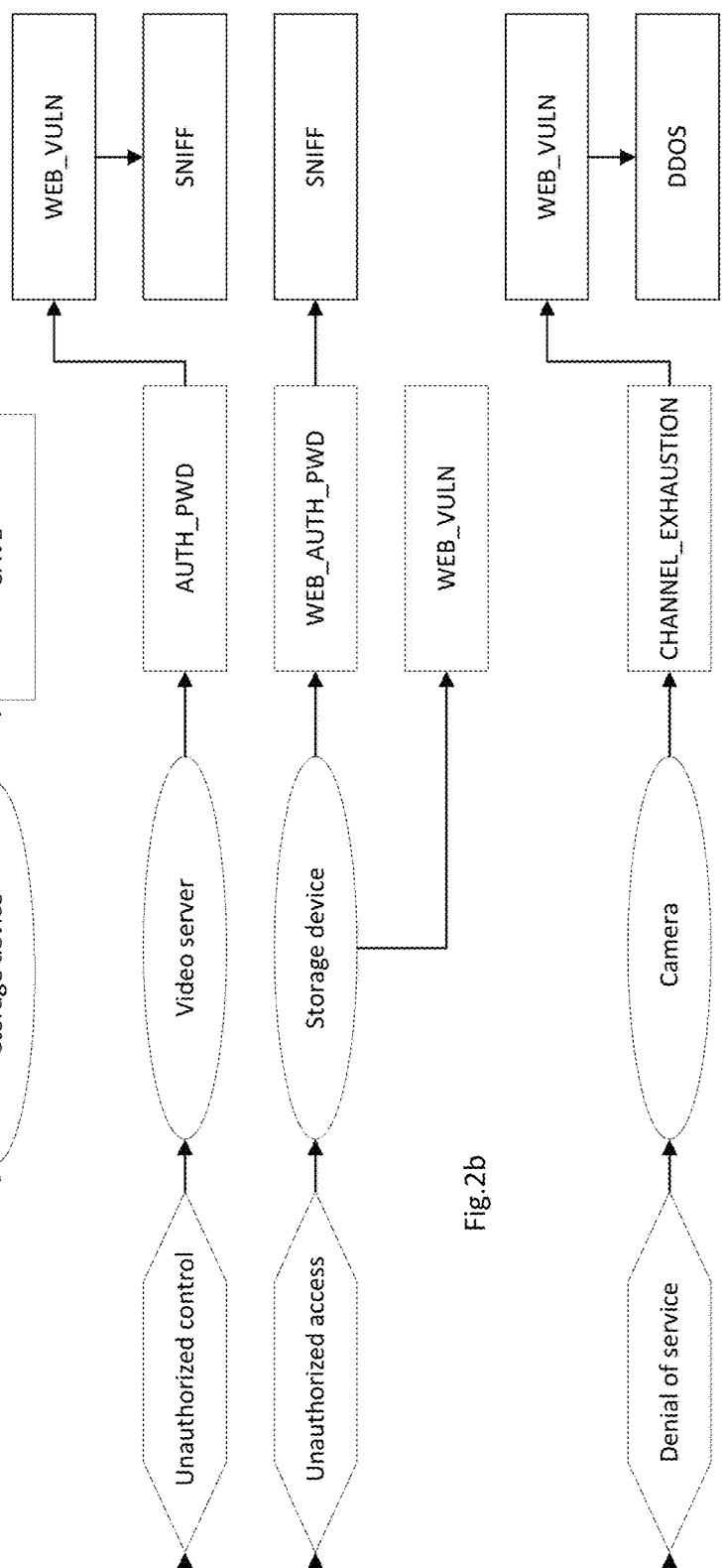
Fig. 2a
Fig. 2b

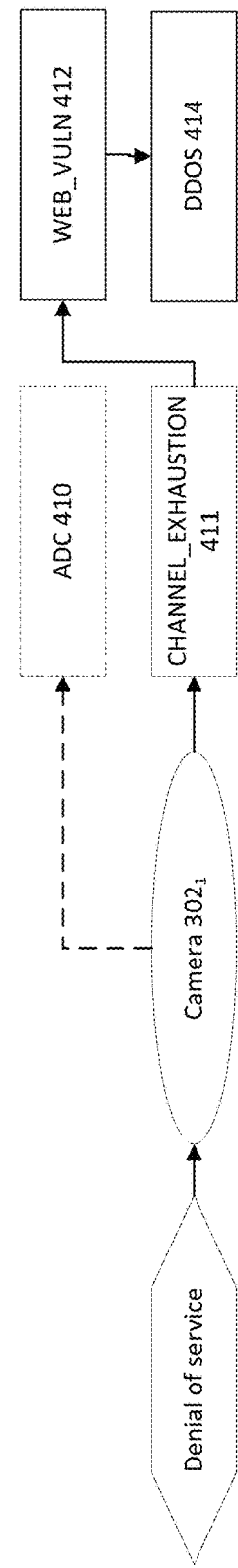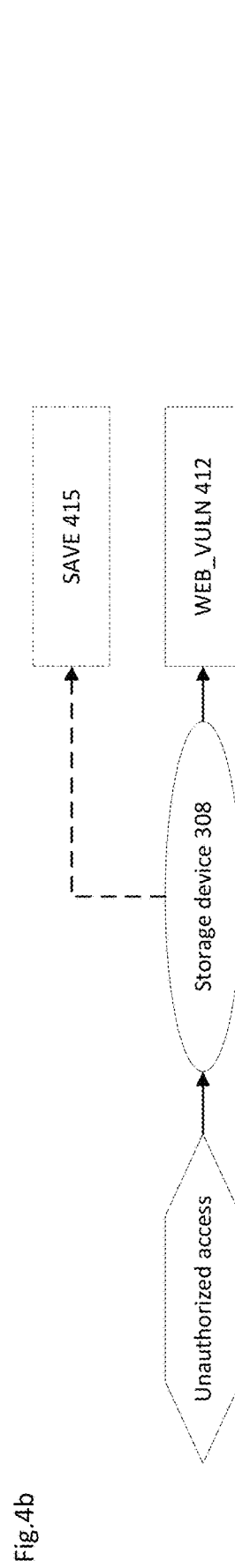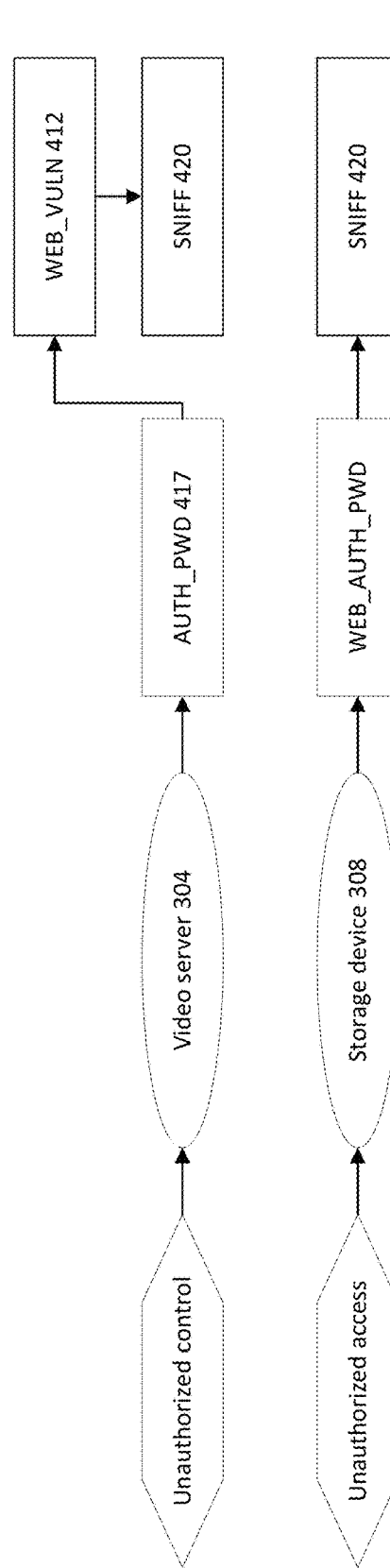
Fig.4a
Fig.4b
Fig.4c

METHOD FOR AUTOMATED TESTING OF HARDWARE AND SOFTWARE SYSTEMS

CROSS REFERENCE TO RELATED APPLICATIONS

This application claims benefit of priority under 35 U.S.C. 119(a)-(d) to a Russian Application No. 2018114433, filed Apr. 19, 2018, the entire contents of each of which are incorporated herein by reference.

FIELD OF TECHNOLOGY

The present disclosure generally relates to testing systems, and more specifically, to methods and systems for automated testing of hardware and software systems.

BACKGROUND

The architecture of hardware and software systems and complexes is generally designed to achieve one or more stated goals previously formulated by interested parties (e.g., stakeholders) that have an interest or concern in the hardware-software systems. The interests of the parties, according to industry standards, are expressed as a benefit or a problem. Examples of interests with regard to a system are: functionality, feasibility, applicability, system characteristics, system properties, known limitations, structure, behavior, functioning, resource utilization, reliability, functional safety (e.g., as defined in industry standards for safety of electrical, electronic, programmable electronic, safety related systems), data integrity, guaranteed availability on demand, and so forth.

Only authorized users of the hardware-software systems (also referred to as rights holders) are considered as interested parties in the design process. This means that only the users (groups, organizations) who will be allowed to perform a certain operation in the system to realize their interest, or whose interest needs to be considered by mandate of a standard (such as a standard establishing requirements for functional safety), are an interested party. As a result, the created system meets the requirements of the authorized users and the requirements of functional safety, but does not ensure informational security of the created system, where information security includes data security, data confidentiality, security of personal data (privacy) and the like. In these systems, additional means are often used afterwards to address information security, the means often not originally provided by the architecture, and significantly reflected during the use of the means, on the realization of the interests of the authorized users and the compliance with the requirements of functional safety. Informational security may also be assured by means which are provided by the architecture, yet without considering the interests of the authorized users and the requirements of functional safety, which may also have an effect afterwards when using the system on the realization of the interests of the authorized users and the compliance with the requirements of functional safety.

Thus, the technical problem consists in the fact that the architecture of a system ensures the attainment of the goals stated by the authorized users and complies with the requirements of functional safety, yet does not ensure informational security. In order to achieve the goals of informational security, additional means that are not provided by the architecture are employed, or means provided by the architecture yet, as in the first instance, not considering the interests of the authorized users or the requirements of functional safety are employed.

SUMMARY

The present disclosure describes methods and systems for automated testing of hardware and software systems in order to detect vulnerabilities (taking into account the interests of the authorized users and the requirements of functional safety) which prevent the attainment of the goals of informational security.

The technical result of the disclosed methods and systems consists of assuring the detection of vulnerable software and hardware in the process of automated testing of a system of hardware and software, wherein the vulnerabilities presence stands in the way of attaining the goals of informational security. The testing is performed with consideration of the interests of the authorized users and the requirements of functional safety. The technical result is achieved by testing the system with the use of a threat model and comparing it to a usage model, wherein the results of the comparison reveal the components/elements of the tested system which are vulnerable:

- to a kind of unauthorized use of the system (hereinafter, an indicated kind of unauthorized use);
- to a method of realizing a threat, for a kind of use of the system, which reflects the interests of both a violator and an authorized user, yet which is realized by each of the interested parties by different methods (hereinafter, an indicated method of realizing a threat);
- to a vector of action on the system, which is used to implement a method of realizing a threat, for a kind of use of the system, which reflects the interest of both a violator and an authorized user and which is realized by similar methods (hereinafter, an indicated vector of action on the system).

According to one aspect, an exemplary method of automated testing of hardware and software systems is provided. The method comprises receiving a formalized architecture description describing an architecture of a system being designed, receiving a formalized threat description describing threats to systems similar to the system being designed, building, by a processor, a use model based on the formalized architecture description, building, by a processor, a threat model based on the formalized threat description, determining, by a processor, kinds of use of the system by comparing the threat model to the use model and determining, by a processor, components of the system based on the kinds of use.

In another aspect of the method, the use model comprises one or more of: a kind of use of the system reflecting an interest of an authorized user, an element of the system by which the use is realized, or a method of realizing the kind of use by the element.

In another aspect of the method, the threat model comprises one or more of: a kind of threat, wherein the threat is unauthorized use of the system reflecting an interest of a violator, an element by which the kind of threat is realized, a method of realizing the threat by the element, or a vector of action on the system to carry out a method of realizing the threat.

In another aspect of the method, the kinds of use of the system reflect one of only an interest of a violator, an interest of both a violator and an authorized user, yet realized by each of the interested parties in different ways or an interest of both a violator and an authorized user and realized in similar ways.

In another aspect of the method, the kinds of use of the system reflecting an interest of an authorized user and a method for realizing that kind of use meet requirements of functional safety.

In another aspect of the method, the components of the system are vulnerable to one of a kind of unauthorized use of the system, a method of realizing a threat, for a kind of use of the system, which reflects the interests of both a violator and an authorized user, yet which is realized by each of the interested parties by different methods, or a vector of action on the system, which is used to implement a method of realizing a threat, for a kind of use of the system, that reflects the interest of both a violator and an authorized user and which is realized by similar methods.

In another aspect of the method, a component of the system is vulnerable to a kind of use when it does not limit the indicated kind of unauthorized use of the system, wherein a component is recognized as being vulnerable to the indicated method of realizing a threat if it does not limit the indicated method of realizing a threat, wherein the component is recognized as being vulnerable to the indicated vector of action on the system if it does not limit the indicated vector of action on the system.

In another aspect of the method, impossibility of limiting the kind of use, the indicated method of realizing the threat, or the indicated vector of action, is dictated by functional capabilities of configuration of the components realizing the elements of the system being tested.

In another aspect, the method further comprises selecting hardware and software components based on the comparison of the use model and the threat model, for realization of the system elements to limit the kind of unauthorized use of the system, and to limit the method of realizing a threat, and to limit the vector of action on the system.

In another aspect of the method, the formalized architecture description is produced in accordance with recognized standards and contains at least: system elements comprising system components and links between the system components, and interests of authorized users with respect to the system.

In another aspect of the disclosure, a system is provided for automated testing of hardware and software systems, the system comprising a hardware processor configured to receive a formalized architecture description describing an architecture of a system being designed, receive a formalized threat description describing threats to systems similar to the system being designed, build a use model based on the formalized architecture description, build a threat model based on the formalized threat description, determine kinds of use of the system by comparing the threat model to the use model and determine components of the system which are vulnerable to each of the kinds of use.

In another aspect of the disclosure, a non-transitory computer-readable medium is provided, storing instructions thereon for automated testing of a system of hardware and software. The instructions comprise receiving a formalized architecture description of the architecture of a system being designed, receiving a formalized threat description of threats to systems similar to the system being designed, building a use model based on the formalized architecture description, building a threat model based on the formalized threat description, determining kinds of use of the system by comparing the threat model to the use model; and determining components of the system which are vulnerable to each of the kinds of use.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 2a illustrates the use model for a video monitoring system being designed, in accordance with exemplary aspects of the present disclosure;

FIG. 2b illustrates the threat model for a video monitoring system being designed, in accordance with exemplary aspects of the present disclosure;

FIGS. 4a, 4b and 4c each represent the results of a comparison of the use model and the threat model, in accordance with exemplary aspects of the present disclosure;

DETAILED DESCRIPTION

Figure 1:
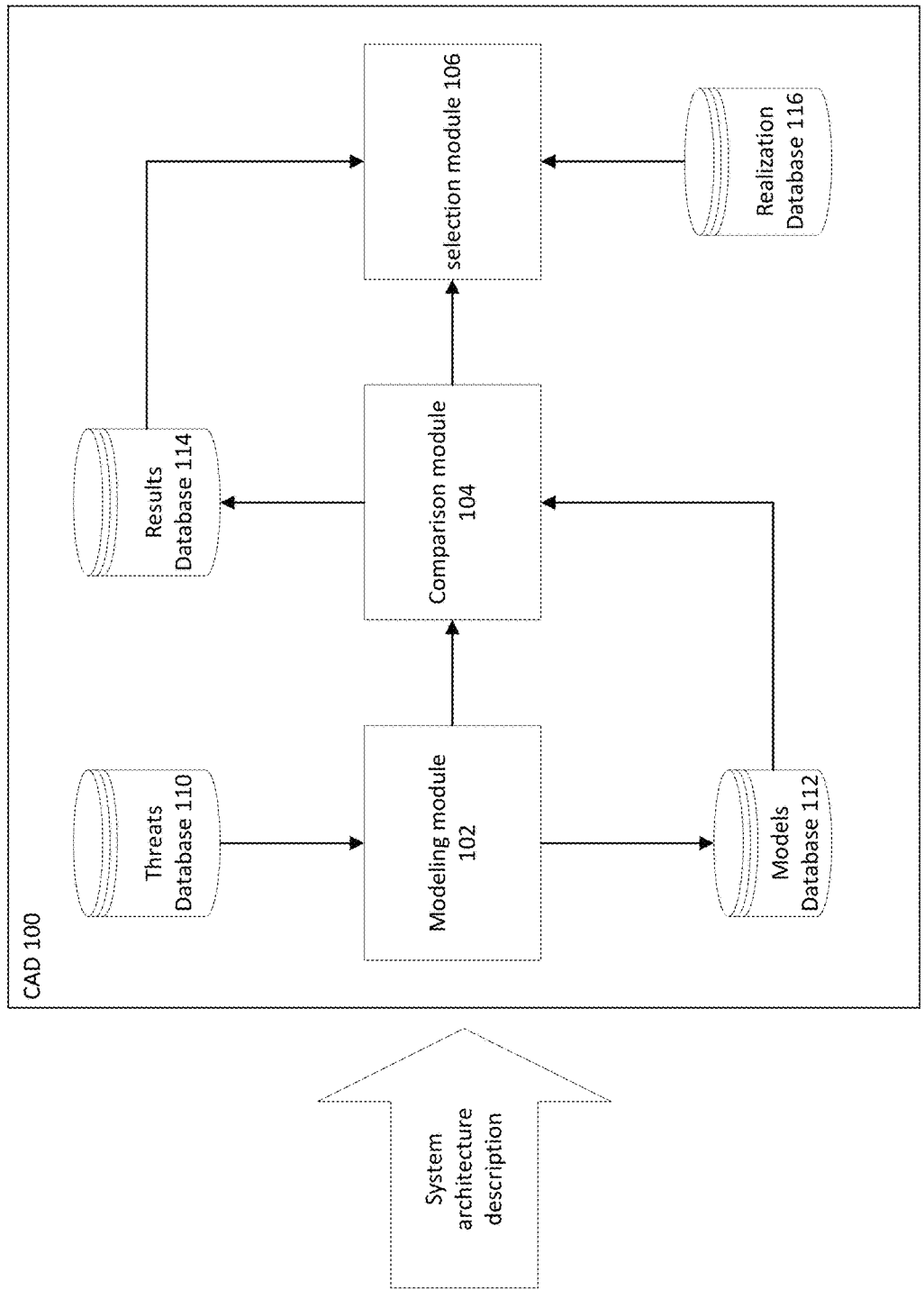
FIG. 1 is a block diagram of the system for automated design of hardware and software systems, in accordance with exemplary aspects of the present disclosure.

Exemplary aspects are described herein in the context of a system, method and computer program product for automated testing of hardware and software systems. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items. The following are a list of terms and their definitions used throughout this disclosure.

An architecture (of a system or complex) is the fundamental concepts or attributes of the system in an environment, embodied in its elements, relations, and specific principles of its design and development. System elements refer to at least the system components and the links between the system components, or in the case of a complex, the links between systems of the complex. The system elements may be realized by hardware and/or software components. Variant realizations of the hardware and software are determined in the course of the design of the system.

An architecture description is a work product used to express an architecture. In a particular aspect, it is formalized by a UML (Unified Modeling Language). In accordance with ISO/IEC/IEEE 42010, the architecture description contains many applications on the part of various interested parties for the entire life cycle of the system; the formalized architecture description is also used as input to an automated tool kit for modeling, system simulation and analysis, such as a CAD.

An interest (alternatively referred to as a concern) of a system is a benefit or problem(s) in the hardware-software system being designed, pertaining to one or more interested parties.

An interested party (e.g., stakeholder) is an individual, a team, an organization, or groups of these, having an interest in the system.

An authorized user is a user constituting one of the interested parties who is permitted to perform a certain operation in the system (use the system) to realize an interest.

A use model is a formalized description of variant uses of a system by authorized users. Use models may include one or more of the following:
  the kind of use of the system reflecting the interest of an authorized user;
  the system element (hereafter, element) through which that use is realized;
  the method of realizing the given kind of use by said element.

In one aspect of the disclosure, the use model includes all three elements above: the kind of use of the system reflecting the interest of an authorized user, the system element through which that use is realized, and the method of realizing the given kind of use by said element.

A violator (unauthorized user) is a user constituting one of the interested parties not having a right to perform a certain operation in the system being designed to realize his interest.

A threat is a potential event which may violate the proper functioning of the system being designed and thereby directly or indirectly inflict damage. The kinds of threats to a system are diverse and have many classifications; in the context of the present disclosure, classifications according to the nature of the violation are used, namely:
  violation of confidentiality of data;
  violation of data integrity/substitution of data;
  violation of system operability (incl. denial of service);
  unauthorized intervention in system functioning;
  and so forth.

A threat model is a formalized description of threats to informational security in regard to a system being designed. A threat model includes one or more of:
  the kind of threat, where the threat is unauthorized use of a system reflecting the interest of a violator;
  the element by which the given kind of threat is realized;
  the method of realizing the threat by the indicated element;
  the vector of action on the system to carry out the method of realizing the threat (the attack vector).

In some aspects of the disclosure, the threat model includes all of the listed items above, while in some aspects the threat model may only include a portion of the listed items above.

A method of realizing a threat, or the attack, is the actions of a violator in the realization of a threat to security of a particular kind. For each element of the system, a particular kind of threat may be realized in different ways, including the involvement of other system components.

An attack vector is a direction or specific way of acting on a system by a violator in the realization of a threat to security. In the context of the present application, the attribute "attack vector" is identical to the attribute "vector of action on the system to carry out the method of realizing the threat". The characteristics defining an attack vector may be one or more of:
  the source or the group of sources of the attack;
  the element or group of elements which are the target of the attack;
  the kind of action;
  the means of action.

In some aspects, the characteristics defining an attack vector include all or a portion of the items listed above.

The threat model and the use model might not differ formally from each other in any way (except for the attack vector) for an identical system or complex. A classifying attribute making it possible to distinguish one model from another is the fact that a use model reflects the interest of an authorized user, while a threat model reflects the interest of a violator. Examples of models for actual systems will be given below.

In one aspect of the present disclosure, the technical problem pointed out in the prior art is solved by the design of a system with the use of a threat model as opposed to its use model. Thus, the interested parties are considered to be not only the authorized users, but also the violators. The interests of the authorized users are opposed to the interests of the violators and the system architecture must provide the realization of the interests of the authorized users and limit the realization of the interests of the violators.

The technical result of the disclosed methods and systems consists of assuring the detection of vulnerable hardware and software in the process of automated testing of a system of hardware and software (or a complex), wherein the vulnerabilities presence stands in the way of attaining the goals of informational security. The testing is performed with consideration of the interests of the authorized users and the requirements of functional safety. The technical result is achieved by testing the system with the use of a threat model and comparing it to a usage model, wherein the results of the comparison reveal the components/elements of the tested system which are vulnerable:
  to a kind of unauthorized use of the system (hereinafter, an indicated kind of unauthorized use);
  to a method of realizing a threat, for a kind of use of the system, which reflects the interests of both a violator and an authorized user, yet which is realized by each of the interested parties by different methods (hereinafter, an indicated method of realizing a threat);
  to a vector of action on the system, which is used to implement a method of realizing a threat, for a kind of use of the system, which reflects the interest of both a violator and an authorized user and which is realized by similar methods (hereinafter, an indicated vector of action on the system).

The subject matter of the present disclosure is a method of testing a system of hardware and software by an automated design system, wherein CAD modules receive at their input a formalized description of the architecture of the system being designed (hereinafter, system). Then, on the basis of the description, they build a use model, including: the kind of use of the system reflecting the interest of an authorized user; the element of the system (hereinafter, element) by which that use is realized; the method of realizing that kind of use by the indicated element. The CAD modules also receive from a threats database a formalized description of known threats to systems similar to the one being designed and on the basis of the formalized description of known threats a threat model is built of the same kind as the usage model, including: the kind of threat, where the threat is unauthorized use of the system, reflecting the interest of a violator; the element by which the given kind of threat is realized; the method of realizing the threat by the indicated element; the vector of action on the system to carry out the method of realizing the threat. After building these structures, the threat model is compared to the use model by a method of comparison designed to compare models of the given type in order to determine kinds of use of the system reflecting:
  only the interest of a violator;
  the interest of both a violator and an authorized user, yet realized by each of the interested parties in different ways;
  the interest of both a violator and an authorized user and realized in similar ways.

Having obtained the results of the comparison, the elements/components of the tested system are revealed which are vulnerable:
  to a kind of unauthorized use of the system (hereinafter, an indicated kind of unauthorized use);
  to a method of realizing a threat, for a kind of use of the system, which reflects the interests of both a violator and an authorized user, yet which is realized by each of the interested parties by different methods (hereinafter, an indicated method of realizing a threat);
  to a vector of action on the system, which is used to implement a method of realizing a threat, for a kind of use of the system, which reflects the interest of both a violator and an authorized user and which is realized by similar methods (hereinafter, an indicated vector of action on the system).

A component or element is recognized as being vulnerable to the indicated kind of use if it does not limit the indicated kind of unauthorized use of the system; a component or element is recognized as being vulnerable to the indicated method of realizing a threat if it does not limit the indicated method of realizing a threat; a component or element is recognized as being vulnerable to the indicated vector of action on the system if it does not limit the indicated vector of action on the system. The impossibility of a limiting is dictated by the functional capabilities or methods of configuration of realizing the elements of the system being tested.

In a particular case, the CAD receives at its input a formalized architecture description which is produced in accordance with recognized standards and contains at least: system elements, including system components and the links between components; the interests of authorized users with respect to the system.

In the present disclosure, a system having the identical purpose or at least one identical element may be recognized as being similar.

In a particular case, the kind of use of the system reflecting the interest of the authorized user and the method of realizing that kind of use meet the requirements of functional safety.

In a particular case, on the basis of the comparison of the models, the selection module additionally selects hardware and software for the realization of the system elements so that the functional capabilities or methods of configuration of such elements:
  limits the indicated kind of unauthorized use of the system;
  limits the indicated method of realizing a threat; and/or
  limits the indicated vector of action on the system.

Certain recommended elements and/or components are compared with the elements and/or components of the system being tested, and the elements and/or components of the system being tested are recognized as being vulnerable if they do not correspond to the recommended elements and/or components. The comparing of the elements and/or components may be done by comparing the version of the elements and/or components or the types of the elements and/or components and in a given case the elements and/or components are recognized as being vulnerable elements and/or components if their type or version does not correspond to the recommended elements and/or components. In another case, the comparing of the elements and/or components is done by comparing the functional capabilities or methods of configuration of the elements and/or components recommended for realization of the element with the functional capabilities of the elements and/or components realizing that element in the system being tested, and then the elements and/or components are recognized as being vulnerable if their functional capabilities or methods of configuration are absent from the recommended elements and/or components. In order to carry out this method of comparison, the functional capabilities and method of configuration of the software and hardware realizing the elements of the system being tested are first determined on the basis of a formalized description of the architecture of the system being tested.

The design of hardware-software systems and complexes is done by a computer-aided automated design system 100 (hereinafter, CAD), a variant realization of which is shown in FIG. 1. At its input, the CAD 100 receives a formalized architecture description of the system being designed, including at least: the system elements, including system components and the links between components; the interests of the authorized users with regard to the system. The CAD 100 outputs the hardware and software for the realization of the elements of the system being designed. The CAD 100 includes the following modules:
  modeling module 102;
  comparison module 104;
  selection module 106.

The CAD 100 has at its disposal databases containing:
  information on threats (hereinafter, the threats database 110);
  threat models and use models (hereinafter, the models database 112);
  results of the comparison of models (hereinafter, the results database 114);
  variant hardware and software realizations of the elements of systems and complexes (hereinafter, the realizations database 116).

In a particular case, hardware belonging to the class of hardware that is resistant to physical action, hacking, and falsification (anti-tamper, tamper resistance) is also selected for the realization of the system elements.

The threats database 110 contains formalized information about threats. A threat is described by enumerating its principal characteristics.

For example:

Threat kind. System element. Method of realizing a threat: attack vector.

According to one aspect of the disclosure, the threats database 110 is continuously updated by informational security specialists and analysts, as they discover new kinds of threats, methods of their realization, and previously unknown attack vectors; the list of system elements vulnerable to a particular kind of threat is also expanded. The same kind of threat (unauthorized control, unauthorized access to information, denial of service, etc.) will pertain to the system as a whole and may be realized in regard to different components and other elements of the system, compromising both elements individually and the system as a whole. For different system elements, the threat descriptions may be repeated, but the attacks, the influence on the system, the risks related to the threats and the counteracting of these threats may be different. For each element, a defined kind of threat may be realized in different ways, including the involvement of other system components. For example, to produce a denial of service for a camera of a video monitoring system (in the threat description the camera is the system element) having access to the Internet via a web server, it is first necessary to compromise the web server (see FIG. 2b WEB_VULN).

According to one aspect of the disclosure, the models database 112 contains constructed use models and threat models. The models database 112 is populated in both the course of modeling carried out directly by the modeling module 102 of CAD 100 and also externally, when already constructed models are loaded into the models database 112. The modeling module 102 may convert the models stored in the models database 112 into a form used for further comparison. The use models and the threat models may have an identical form. For example, for the description of the threat given above, tree models may be used where the characteristics ("threat kind", "system element", and "method of realizing a threat") are the nodes of the tree.

Figure 3:
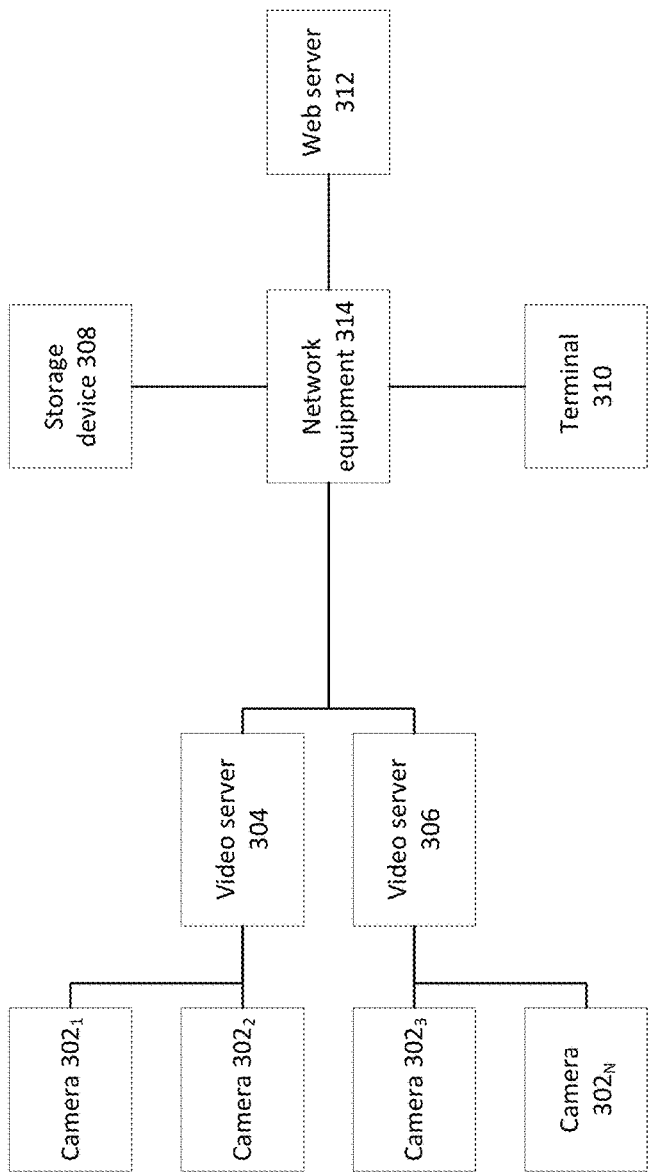
FIG. 3 represents the diagram of the video monitoring system being designed, in accordance with exemplary aspects of the present disclosure.

FIG. 3 shows a diagram of a video monitoring system 300 being designed, where the video monitoring cameras $302_1$ to $302_N$ are connected to video servers 304 and 306 enabling the receiving, dispatching, and storing of the video streams from these cameras. A storage device 308 is used for the storing. Access to the video streams in the storage device 308 by authorized users is possible both from the inside (via a terminal 310) and from the outside, via the web server 312. Access to the video servers 304 or 306 for control of the system 300 is possible via a terminal 310. The system components are linked by network equipment 314. Thus, in this aspect the use model includes the following kinds of use (as reflected in the model of FIG. 2, though other uses may be contemplated):

control of the system 300, realized via a video server 304 or 306 from a terminal 310 by authentication on the video server 304 and/or 306;

access to the video streams contained in the storage device 308, realized through the storage device 308, by authentication on the web server 312;

video recording, realized by:

camera, via analog-digital conversion (ADC) of the optical signal (video stream) by one or more of the cameras $302_1$ to $302_N$ (in FIG. 2 ADC);

video server 304 and 306, by reception and processing of the converted signal (in FIG. 2 RECEPTION/CONVERT);

storage device 308, by saving the received and processed signal (in FIG. 2 SAVE).

FIGS. 2a and 2b show an example of a use model (FIG. 2a) and a threat model (FIG. 2b) for the system being designed, as depicted in FIG. 3. The threat model for this system will be discussed when discussing the modeling module 102.

Figure 5:
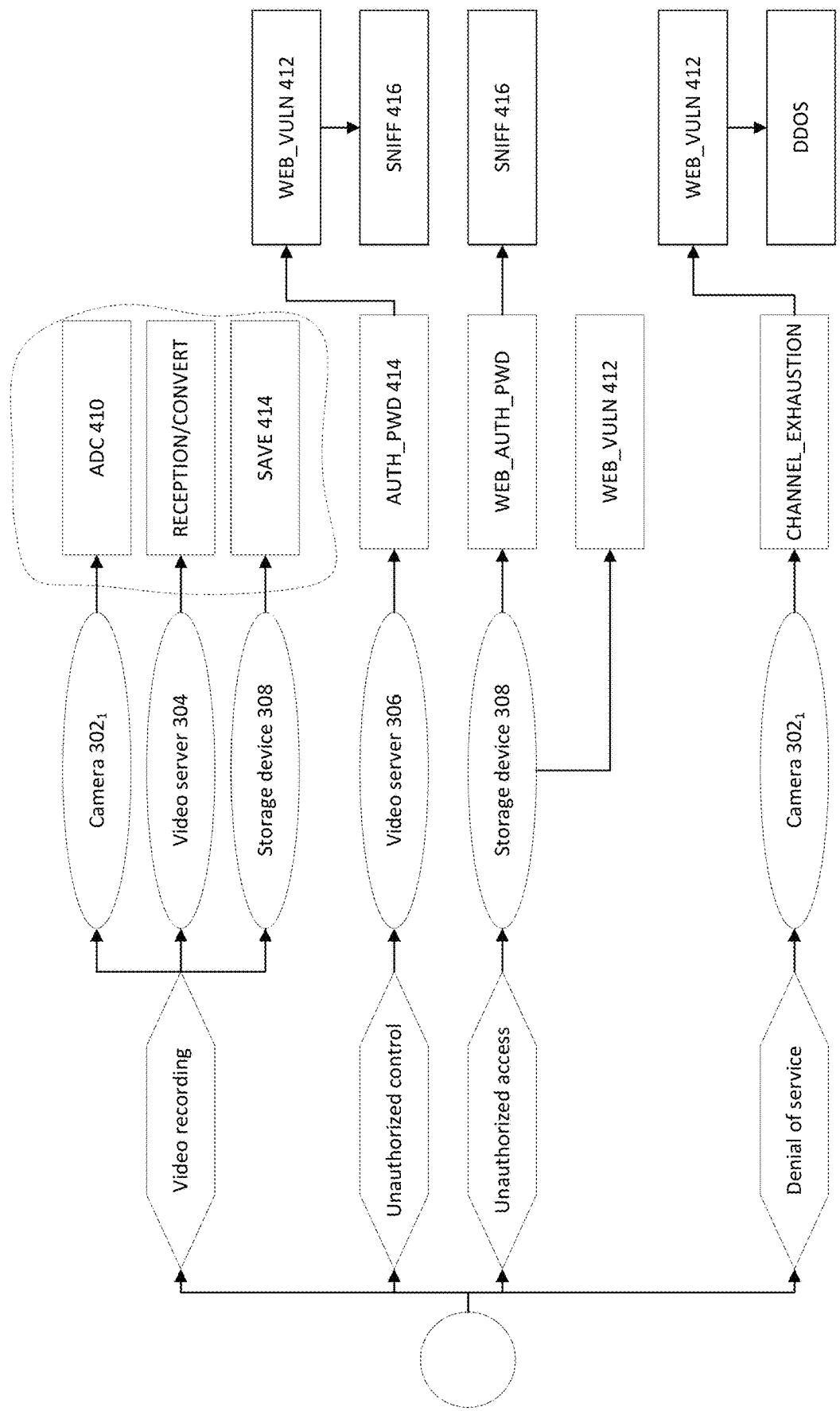
FIG. 5 represents the results of a comparison of the use model and the threat model, expressed in the form of a model, in accordance with exemplary aspects of the present disclosure.

According to one aspect of the disclosure, the results database 114 contains the results of a comparison of a use model with a threat model. The form of the result contained in the database varies and may depend on the kind of model and the method of comparison. For example, for tree models, the model will contain nodes and branches, as shown in the example illustrated in FIGS. 4a-4c. FIG. 5 presents an example of a comparison result (performed by the intersection method) of the models presented in FIG. 2a and FIG. 2b, likewise constituting a tree model. These examples shall be discussed when describing the comparison module and the selection module 106.

According to one aspect of the disclosure, the realization database 116 contains a description of the software and hardware and the methods of configuring the software and hardware for the selection of the realization of the elements of the systems being designed. The description includes the actual software and hardware components (including its version), its configuration variants and the functional capabilities provided by the software/hardware components configured in a particular manner, both individually and in combination with other components. The description of the components likewise contains information on which kinds of threats or attacks they are or are not subjected to, and how they can be combined with other components to become resistant to a particular type of threat or attack.

According to one aspect of the disclosure, the modeling module 102 may construct use models and threat models on the basis of the architecture description of the system being designed. The model is constructed in order to convert the description of threats and the description of use to the same form in order to make a comparison. The module 102 constructs the use model on the basis of the interests of the authorized users in regard to the system (in a particular case, the requirements for the system) as obtained at the input of CAD 100 in the formalized architecture description. Such interests for the system being designed in the example of FIG. 3, clearly, are the exploitation interest assuming the following use by an authorized user:

video recording;

control of the video recording system;

access to the saved video streams.

The architecture description likewise indicates the elements by which the aforementioned use is realized and the methods of realization. On this basis, the modeling module 102 compiles the kinds of use and constructs a model, one example of which is shown in FIG. 2a.

The modeling module 102 also constructs threat models on the basis of the interests of the violators with respect to the system. The interests of the violators are expressed as threats contained in the threats database 110. The threats are selected based on the characteristics of the system being designed (the system elements, the purposes of the elements and of the system as a whole), so that the modeling module 102 extracts from the threats database 110 known threats to systems similar to the one being designed (systems with the same purpose and/or goals) and separately for the elements contained in the system being designed. The interest of the violators with respect to the system being designed, as can be understood from the example, is likewise an exploitation interest assuming the following use by the violator:
  unauthorized control of the video recording system;
  unauthorized access to the saved video streams.

Another interest may be the placing of the system in a non-operational state—a denial of service.

In a particular case, the models database 112 or threats database 110 may already contain a modeled threat description for the system being designed; in this case the modeling module 102 rearranges that model into the necessary form for a comparison.

The threat description (as mentioned above when describing the threats database 110) indicates the elements by which the threat is realized and the methods of realization of the threat (attack), as well as the attack vectors. On this basis, the modeling module 102 constructs a model, one example of which is shown in FIG. 2b. For the system being designed from the example shown in FIG. 3 the threats are:
  unauthorized control, realized through the video server, by:
    a stolen password (AUTH_PWD) for authorization on the video server, where the attack vectors for this method are:
      exploitation of a vulnerability of the web server (WEB_VULN) to penetrate into the internal network;
      followed by interception of the mentioned password within the network (SNIFF);
  unauthorized access, realized through the storage device, by:
    a stolen password (WEB_AUTH_PWD) for authorization on the web server, where the attack vectors for carrying out this method are:
      intercepting said password (SNIFF) by eavesdropping on the connection between an authorized user obtaining access from an external network and the web server;
      exploitation of a vulnerability of the web server (WEB_VULN);
  denial of service, realized through the camera, by:
    channel exhaustion (CHANNEL_EXHAUSTION), where the attack vectors for this method are:
      exploitation of a vulnerability of the network equipment, especially the web server (WEB_VULN), for direct access to the cameras from an external network;
      followed by a distributed attack on the cameras (DDOS) to which direct access has been obtained.

While the previous threats are specific to the video monitoring system 300, they may equally apply to other systems. Other threats or types of threats are also contemplated, though not described in full detail.

According to one aspect of the disclosure, the comparison module 104 may compare the use model and the threat model. The method of comparison itself depends on the kind of models. For tree models, one method of comparison uses an intersection, the result of which is shown in the figures, where the result of the comparison is a model (FIG. 5) or parts of models (FIGS. 4a-4c) indicating:
  the kinds of use of the system being designed reflecting only the interest of a violator (FIG. 4a);
  the kinds of use of the system being designed reflecting the interest of both a violator and an authorized user, yet realized by each of the interested parties in different ways (FIG. 4b); and/or
  the kinds of use of the system being designed reflecting the interest of both a violator and an authorized user and realized in similar ways (FIG. 4c).

The result of the comparison likewise contains methods of realization (requirements on the system element) reflecting the interest of an authorized user (depicted in FIGS. 4a-4c, and highlighted in FIG. 5 by dotted lines).

FIG. 4a shows the kind of use reflecting only the interest of a violator. There is no such kind of use as a denial of service in the use model, but the denial of service is realized through the "camera" system element, the camera being used in the use model for the realization of the interest of the authorized user. Therefore the result of the comparison is supplemented with information on the method of realizing the interest of an authorized user (in FIG. 4a this is ADC 410), and this will be taken into account by the selection module 106. The denial of service is realized by an attack on channel exhaustion (in FIG. 4a CHANNEL_EXHAUSTION 411), which is possible by exploiting a vulnerability of the network equipment, such as the web server (in FIG. 4a WEB_VULN 412), for direct access to the camera from an external network, after which a distributed attack is carried out on the camera (in FIG. 4a DDOS 414).

FIG. 4b shows a kind of use of the system reflecting the interest of both a violator and an authorized user, yet realized by each of the interested parties in different ways. Such a kind of use as access reflects the interest of both a violator and an authorized user. Yet the method of realizing the threat differs from the method of realizing the use reflecting the interest of an authorized user. To realize the threat, vulnerabilities of the web server are exploited (in FIG. 4b denoted as WEB_VULN 412). The storage device 308 is used in the use model to realize the interest of the authorized user (video recording), and therefore the result of the comparison is supplemented with information on the method of realizing the interest of the authorized user (in FIG. 4b this is SAVE 415), and this will be taken into account by the selection module 106 when determining the requirements of the functional capabilities of the software and hardware components used for realization FIG. 4c shows the kinds of use of the system reflecting the interest of both a violator and an authorized user, and realized in similar ways. Such a kind of use as "control" reflects the interest of both a violator and an authorized user. Furthermore, this use is realized in similar ways, through authorization by a password on the video server (in FIG. 4c AUTH_PWD 417), the difference being how this password is obtained. The violator obtains this password by exploiting vulnerabilities of the web server (WEB_VULN 412), which lets him penetrate into the network linking the components of the video monitoring system with subsequent interception of this password using sniffing techniques in the network (SNIFF 420). The attack vectors are denoted as WEB_VULN 412 and SNIFF 420 in FIG. 4c. Such a kind of use as access reflects the interest of both a violator and an authorized user and may be realized by a violator, including (and FIG. 4b shows another possible method of realization—exploitation of a vulnerability of a web server) in a way similar to the method of use of an authorized user by authorization with a password on the web server. The violator obtains this password by intercepting traffic (SNIFF 420) going to the web server from an external network from an authorized user.

According to one aspect of the disclosure, the selection module 106 may select the components which will realize the system elements, the selection being done on the basis of the results of the comparison of models. The software and hardware for realization of the system elements are selected so that these elements ensure the realization of the interests of the authorized users, yet the functional capabilities or methods of configuration (including the security policy settings) of these elements:
- limit the kinds of use of the system when the given kind of use reflects only the interests of a violator;
- limit the method of realizing a threat, when the given kind of use of the system reflects the interests of both a violator and an authorized user, yet is realized by each of the interested parties in different ways; and/or
- limit the vector of action on the system being used to carry out the method of realizing a threat when the given kind of use of the system reflects the interest of both a violator and an authorized user and is realized in similar ways.

Thus, for the case shown in FIG. 4a, according to one aspect, the kind of use (threat) reflecting the interest of a violator is limited (and in some cases, excluded entirely). However, this kind of use is realized through the element "camera" which is used also to realize the interests of an authorized user (video recording). Thus, the authorized use must also be taken into account (in FIG. 4a ADC) when limiting use. By using the indicated requirements, the selection module 106 queries the realization database 116, indicating what needs to be realized (in the present case, ADC), and what needs to be limited (in the present case, DDOS or WEB_VULN or CHANNEL_EXHAUSTION) or directly excluded (the kind of use: denial of service). In response to this query, the realization database 116 returns possible variants of system hardware and software components that may be used in the system being designed; in the present example, this might be a camera of type BNC (Bayonet Neill-Concelman), which in theory is not subject to a CHANNEL_EXHAUSTION attack.

For the case shown in FIG. 4b, according to one aspect it is desirable to limit (and, in a particular case, totally exclude) the method of realizing a threat by exploiting vulnerabilities of the web server. By using the indicated requirements, the selection module 106 queries the realization database 116, indicating what needs to be limited in the system (in the present case, WEB_VULN 412). In response to the query, the realization database 116 may propose the use of patch control software (patch manager) or exploit prevention software or hardware, or a demilitarization zone (DMZ) component.

According to the aspect of the disclosure shown in FIG. 4c, it is desirable to limit (and, in a particular case, totally exclude) the vector of action on the system used to carry out the method of realizing the threat. To limit the attack vectors, according to one aspect, one of the components of the attack vector which is also a characteristic thereof may be blocked or its realization is rendered impossible:
- the source or the group of sources of the attack;
- the element or group of elements which are the target of the attack;
- the kind of action;
- the means of action.

Thus, the selection module 106 queries the realization database 116, indicating what needs to be realized (in the present case, the connection between an authorized user from an external network and the web server), and what needs to be limited (in the present case, the intercepting of a password for authorization on the web server). In response, the database returns a result indicating the use of a protected connection (the use of encryption) between the authorized user and the web server, thereby limiting the attack vector. Traffic may still be intercepted in this aspect, but it is not possible to extract a password from that traffic because the connection is encrypted.

Figure 6:
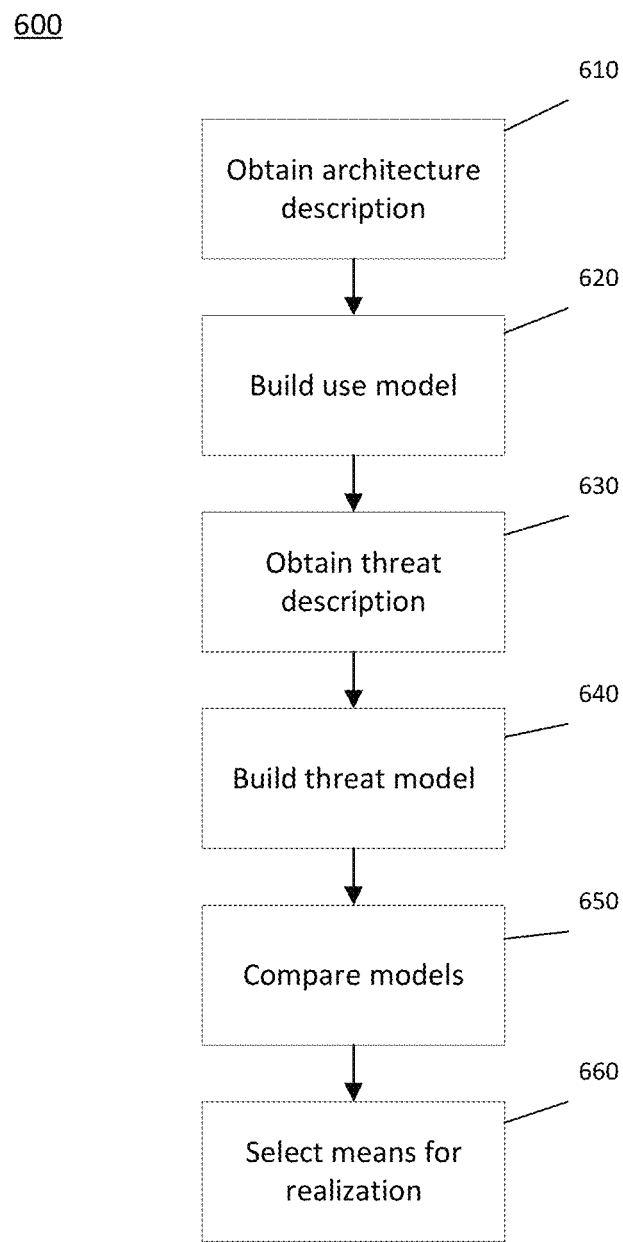
FIG. 6 represents the method for automated design of hardware-software systems and complexes, in accordance with exemplary aspects of the present disclosure.

The CAD 100 illustrated in FIG. 1 is used to carry out the method for automated design of a system of hardware and software. This method 600 is shown in FIG. 6. In the beginning, the input of the CAD in step 610 obtains a formalized architecture description of the system being designed (hereafter, the system), including at least:
- system elements, including system components and the links between components;
- the interests of authorized users with respect to the system.

On the basis of the description obtained in step 620 the modeling module 102 constructs a use model including:
- the kind of use of the system reflecting the interest of an authorized user;
- the system element (hereafter, element) through which such use is realized;
- the method of realizing the given kind of use by said element.

The model constructed by the modeling module 102 is saved in the model database. In step 630, a formalized description is obtained from the threats database 110 of the known threats to systems similar to the one being designed, and on the basis of the threat description in step 640 the modeling module 102 constructs a threat model of the same kind as the use model, including:
- the kind of threat, where the threat is unauthorized use of a system reflecting the interest of a violator;
- the element by which the given kind of threat is realized;
- the method of realizing the threat by said element;
- the vector of action on the system to carry out the method of realizing the threat.

Next, in step 650, the comparison module extracts the constructed models from the models database 112 and compares the threat model to the use model by the method of comparison designed for comparing models of the given kind, in order to determine:
- the kinds of use of the system reflecting only the interest of a violator;
- the kinds of use of the system reflecting the interest of both a violator and an authorized user, yet realized by each of the interested parties in different ways;
- the kinds of use of the system reflecting the interest of both a violator and an authorized user and realized in similar ways.

The selection module 106 in step 660 selects, on the basis of the comparison, the hardware and software for the realization of the system elements (making it possible to realize the interests of the authorized users) such that the functional capabilities or methods of configuration of such elements at least:
- limit the kinds of use of the system when the given kind of use reflects only the interests of a violator;
- limit the method of realizing a threat, when the given kind of use of the system reflects the interests of both a violator and an authorized user, yet is realized by each of the interested parties in different ways;
- limit the vector of action on the system being used to carry out the method of realizing a threat when the given kind of use of the system reflects the interest of both a violator and an authorized user and is realized in similar ways.

In a particular case, the functional capabilities or methods of configuration of such components ensure not only the realization of the interests of the authorized users, but also the realization of the requirements of functional safety. In certain cases, the requirements of functional safety are the interests of one of the interested parties.

Figure 7:
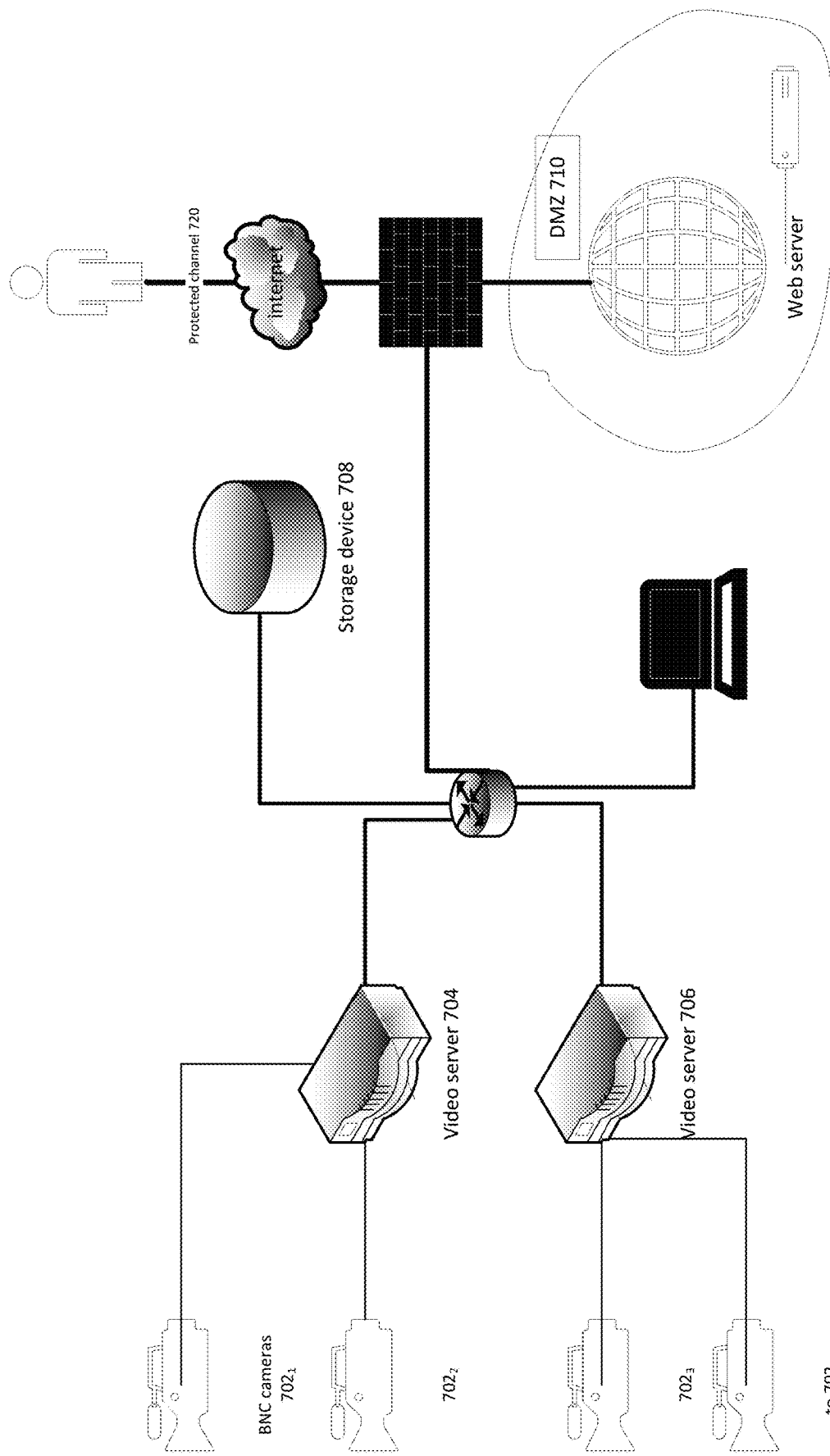
FIG. 7 represents a variant realization of the video monitoring system being designed, in accordance with exemplary aspects of the present disclosure.

A variant realization of the elements of the system being designed from the example is shown in FIG. 7. To ensure the interests of the authorized users and not the possibility of realization of threats by violators, the key elements in the realization of the architecture are:

BNC cameras 702$_1$ to 702$_M$;
a protected channel 720 between an authorized user and the web server;
a demilitarized zone (DMZ) 710 in which the web server is situated.

Ensuring the safety of the system is an ongoing action throughout the period of service of the system. During the period of service, change may occur in: the threat model, the use model, and changes may be made in the hardware and software of the system. In these cases, it is desirable in one aspect of the disclosure to perform a testing of the system in order to discover hardware and/or software components which might not provide the required use of the system or its safety, which render the system vulnerable, and so forth.

Figure 8:
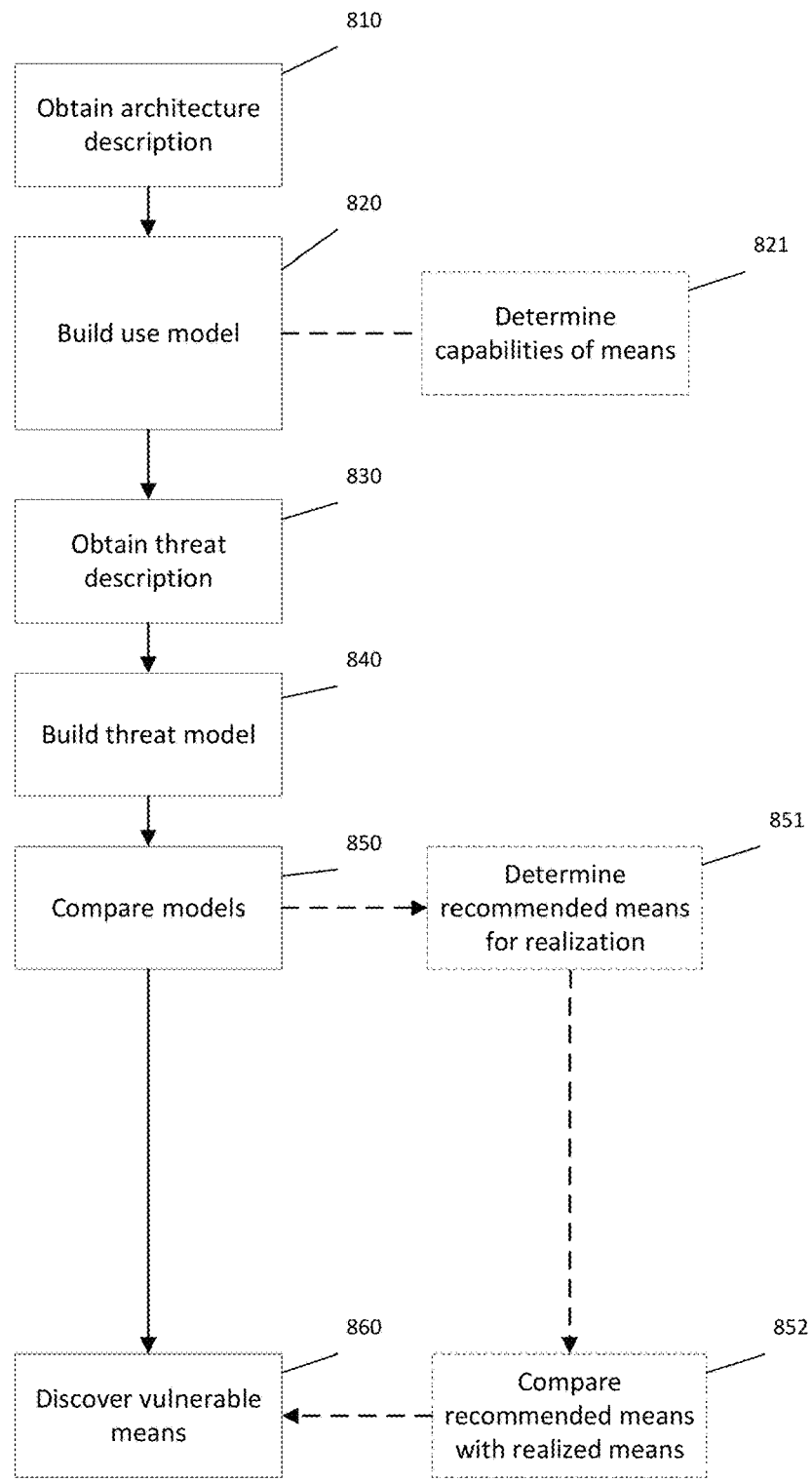
FIG. 8 represents the method for automated testing of hardware-software systems and complexes, in accordance with exemplary aspects of the present disclosure.

Therefore, in another aspect of the disclosure, the CAD 100 illustrated in FIG. 1 may also carry out an automated testing of a system of hardware and software. The method of automated testing 800 is represented in FIG. 8. In the beginning, the input of the CAD in step 810 obtains a formalized architecture description of the system being tested, including at least:

system elements, including system components and the links between components, and in a particular instance the software and hardware realizing them;
the interests of authorized users with respect to the system.

On the basis of the description obtained in step 820 the modeling module 102 constructs a use model including:

the kind of use of the system reflecting the interest of an authorized user;
the system element (hereafter, element) through which such use is realized;
the method of realizing the given kind of use by the indicated element.

The model constructed by the modeling module 102 is saved in the models database 112. On the basis of the formalized description, in particular that of the hardware and software realizing the system elements, the functional capabilities and methods of configuration of those elements are obtained from the realization database 116. In a particular case, the model might not be built, but rather obtained from the models database 112, if the model has been built during the stage of design of the system. In this case, there is no need to obtain the formalized architecture description; in a particular instance, it is enough to obtain only information about the elements and the hardware and software realizing the system elements. Such information may involve:

the functional capabilities of the elements;
the method of configuration of the components and the relation to other elements;
the model or version of the elements, the type of the elements;
other technical characteristics.

In step 830, a formalized description is obtained from the threats database 110 of the known threats to systems similar to the one being designed, and on the basis of the threat description in step 840 the modeling module 102 constructs a threat model of the same kind as the use model, including:

the kind of threat, where the threat is unauthorized use of a system reflecting the interest of a violator;
the element by which the given kind of threat is realized;
the method of realizing the threat by said element;
the vector of action on the system to carry out the method of realizing the threat.

Next, in step 850, the comparison module extracts the constructed models from the models database 112 and compares the threat model to the use model by the method of comparison designed for comparing models of the given kind, in order to determine:

the kinds of use of the system reflecting only the interest of a violator (the kinds of unauthorized use);
the kinds of use of the system reflecting the interest of both a violator and an authorized user, yet realized by each of a interested parties in different ways.
the kinds of use of the system reflecting the interest of both the violator and an authorized user and realized in similar ways.

In a particular instance, the results of the comparison in step 851 are used to determine recommended components for realization, which may be implemented, for example, as in the method 600 in step 660. Then, in step 852, the recommended components are compared with the components realizing the elements of the system being tested. It is also possible to obtain, as recommendations, not the actual elements/components, but their technical and other characteristics, functional capabilities or methods of configuration, and so forth, and accordingly the comparison with the realized components is done in terms of these, for which corresponding information is at first obtained about the realized components.

The selection module 106 in step 860 detects the vulnerable components of the system being tested, which are vulnerable to threats, to the method of realizing the threats, and to the attack vectors. Vulnerability means that such components:

do not limit the kinds of unauthorized use of the system when the given kind of use reflects only the interests of a violator;
do not limit the method of realizing a threat, when the given kind of use of the system reflects the interests of both a violator and an authorized user, yet is realized by each of the interested parties in different ways;
do not limit the vector of action on the system being used to carry out the method of realizing a threat when the given kind of use of the system reflects the interest of both a violator and an authorized user and is realized in similar ways.

The impossibility of a limiting is determined in a particular case by the functional capabilities or the method of configuration used to realize the elements. In another particular instance, such an impossibility is determined by the version of software (or by the model of hardware). For example, the software of a web server version 1.01 is subject to an attack vector through exploiting of an example vulnerability "CVE 2018—XXXX", where "XXXX" refers to any number/identifier of a vulnerability, with the use of an exploit, while version 1.02 excludes such a possibility, as it does not contain that vulnerability. The impossibility may also be determined by the type of the components. For example, a camera of IP type may be used for a DDoS attack, and may also itself be subjected to the attack, while a camera of type BNC excludes such possibilities.

The detecting of the vulnerable components is performed by comparing the realized components (such as their types, versions, etc.), their functional capabilities and methods of configuration with the recommended components. For example, a kind of use of a camera in a system exists which reflects the interest of a violator—denial of service. In order to limit this kind of use, a requirement is placed on the camera element in the system (a recommendation is made)—the components for realization of the element should be of type BNC. Therefore, if the camera is of type IP, the selection module 106 when comparing the types will discover the discrepancy between the type of the components in the current realization and the recommended type. To obtain the requirements on the system for the forming of recommendations, a comparison is done between the threat model and the use model and on the basis of the results of the comparison the selection module 106 makes a request to obtain the recommended components, types of components, versions of components, and so forth. For the example being discussed, the request indicates the kind of use (threat) which needs to be limited—denial of service, and the system element for which that use needs to be limited—the camera. In response to the request, a response is obtained from the database where the recommended components for realization of the camera element is a camera of BNC type. The selection module compares the recommended type of components with the current realization (obtained during steps 810, 820) and, if there is a discrepancy, will discover that the realized system components does not limit the kinds of threat—i.e., the system is vulnerable as a result of the current realization deviating from the recommended one. The selection module 106 thus checks all the system elements and compares their requirements with the current realization. The validity of the conclusion as to vulnerability depends on the realization database 116 and the threats database 110 being updated and complete. Depending on the structure of the database and the request, the response to the request may contain several recommended models of components, types of components, versions of components, and so forth, where a safe component should correspond to at least one recommendation. For example, the model of a realized components does not correspond to the recommended models (owing to an incomplete realization database 116), but the functional capabilities or methods of configuration correspond to the recommended ones, and therefore that component is not considered to be vulnerable.

In a particular case, the components realized should ensure not only the realization of the interests of the authorized users, but also the realization of the requirements of functional safety. In certain cases, the requirements of functional safety are the interests of one of the interested parties.

In aspects of the present disclosure, by CAD modules is meant actual devices, systems, components, a group of components realized with the use of hardware, such as integrated microcircuits (application-specific integrated circuit, ASIC) or field-programmable gate arrays (FPGA), or, for example, in the form of a combination of software and hardware, such as a microprocessor system and a set of program instructions, as well as neuromorphic (neurosynaptic) chips. The functionality of the CAD modules may be realized exclusively by hardware, as well as in the form of a combination where some of the functionality is realized by software and some by hardware. In certain variant aspects, some of the CAD modules may be implemented on the processor of a general-purpose computer (such as the one shown in FIG. 5). The databases may be realized by all possible methods and are contained either on a single physical medium or on various media, arranged either locally or remotely.

Figure 9:
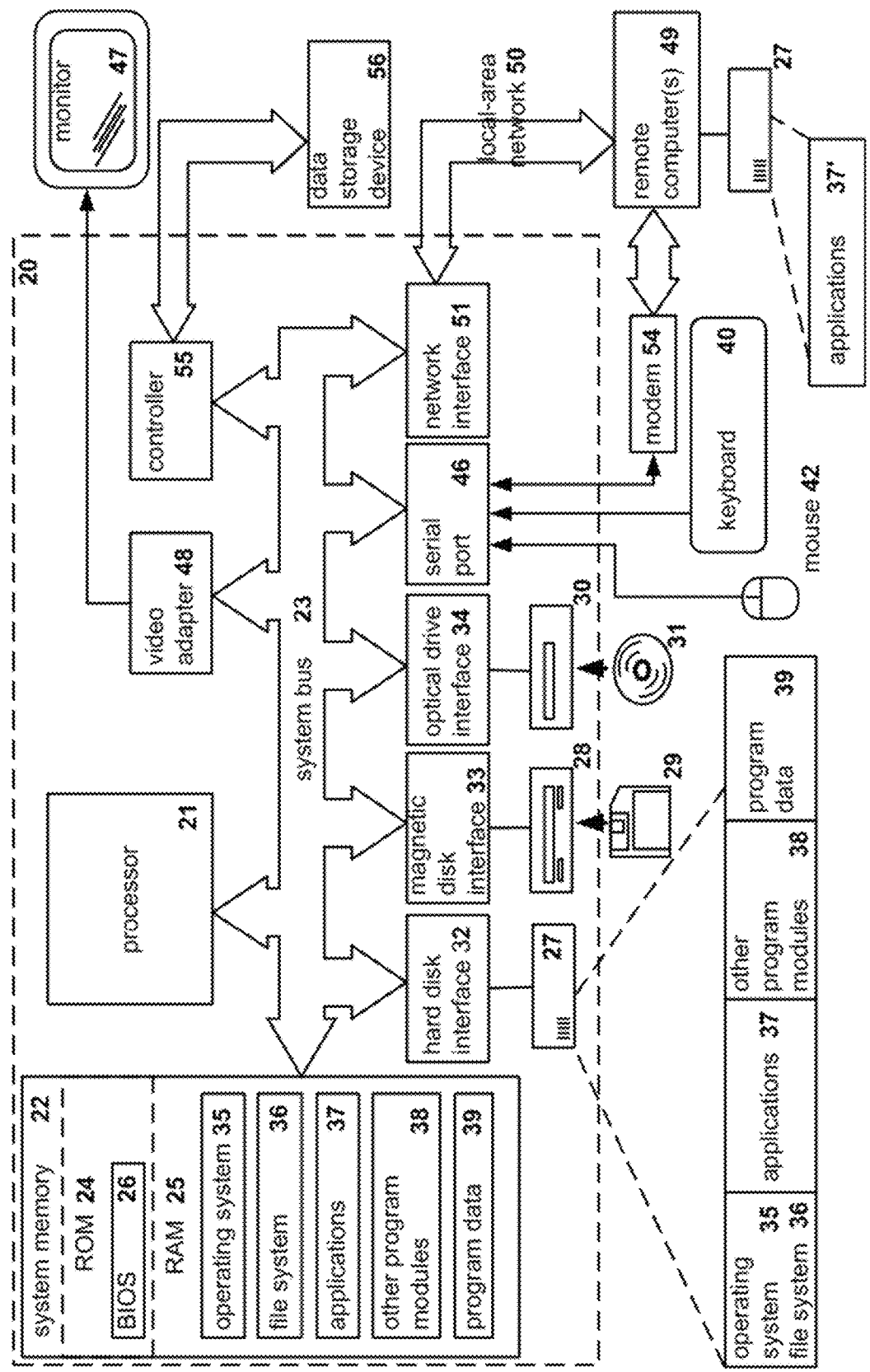
FIG. 9 represents an example of a general-purpose computer system which can be used to realize aspects of the present disclosure.

FIG. 9 is a block diagram illustrating a general-purpose computer system 20 on which aspects of the present disclosure may be implemented in accordance with an exemplary aspect. It should be noted that the computer system 20 can correspond to the system 100, and/or individual components thereof.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and the networks generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without parting from the inventive concepts disclosed herein.

What is claimed is:

1. A method of automated testing of hardware and software systems comprising:
receiving a formalized architecture description describing an architecture of a system being designed, wherein the formalized architecture description includes at least components of the system and links between components of the system;
receiving a formalized threat description describing threats to systems similar to the system being designed based on comparisons of purposes or goals for which the systems are designed;
building, by a processor, a use model based on the formalized architecture description;
building, by a processor, a threat model based on the formalized threat description;
determining, by a processor, kinds of use of the system by comparing the threat model to the use model; and
determining, by a processor, components of the system based on the kinds of use of the system.

2. The method of claim 1, wherein the use model comprises one or more of: a kind of use of the system reflecting an interest of an authorized user, an element of the system by which the use is realized, and a method of realizing the kind of use by the element.

3. The method of claim 1, wherein the threat model comprises one or more of: a kind of threat, wherein the threat is unauthorized use of the system reflecting an interest of a violator, an element by which the kind of threat is realized, a method of realizing the threat by the element, and a vector of action on the system to carry out a method of realizing the threat.

4. The method of claim 1, wherein the kinds of use of the system reflect one of:
only an interest of a violator;
an interest of both a violator and an authorized user, yet realized by each of the interested parties in different ways; or
an interest of both a violator and an authorized user and realized in similar ways, wherein the authorization is by a password and where the password is obtained by the violator using a different method from the method used by the authorized user.

5. The method of claim 4, wherein the kinds of use of the system reflecting an interest of an authorized user and a method for realizing that kind of use meet requirements of functional safety.

6. The method of claim 1, wherein the components of the system are vulnerable to one or more of:
a kind of unauthorized use of the system, a method of realizing a threat, for a kind of use of the system, which reflects the interests of both a violator and an authorized user, yet which is realized by each of the interested parties by different methods, and a vector of action on the system, which is used to implement a method of realizing a threat, for a kind of use of the system, that reflects the interest of both a violator and an authorized user, wherein the interest of both the violator and the authorized user are realized by a same method of realizing the threat, wherein the method of realizing the threat is defined by an attack vector.

7. The method of claim 6, wherein a component of the system is vulnerable to a kind of use when it does not limit the indicated kind of unauthorized use of the system, wherein the component is recognized as being vulnerable to the indicated method of realizing a threat if it does not limit the indicated method of realizing a threat, and wherein the component is recognized as being vulnerable to the indicated vector of action on the system if it does not limit the indicated vector of action on the system.

8. The method of claim 7, wherein impossibility of limiting the kind of use, the indicated method of realizing the threat, or the indicated vector of action, is dictated by functional capabilities of configuration of the components realizing elements of the system being tested.

9. The method of claim 6, further comprising:
selecting hardware and software components based on the comparison of the use model and the threat model, for realization of the system elements to limit the kind of unauthorized use of the system, to limit the method of realizing a threat, and to limit the vector of action on the system.

10. The method of claim 1, wherein the formalized architecture description is produced in accordance with recognized standards and further contains at least: interests of authorized users with respect to the system.

11. An automated design system for testing of hardware and software systems comprising:
a hardware processor configure to:
receive, by a CAD module, a formalized architecture description describing an architecture of a system being designed;
receive, by the CAD module, a formalized threat description describing threats to systems similar to the system being designed based on comparisons of purposes or goals for which the systems are designed;
build, by the CAD module, a use model based on the formalized architecture description;
build, by the CAD module, a threat model based on the formalized threat description;
determine, by the CAD module, kinds of use of the system by comparing the threat model to the use model; and
determine, by the CAD module, components of the system which are vulnerable to each of the kinds of use.

12. The system of claim 11, wherein the use model comprises one or more of: a kind of use of the system reflecting an interest of an authorized user, an element of the system by which the use is realized, and a method of realizing the kind of use by the element.

13. The system of claim 11, wherein the threat model comprises one or more of: a kind of threat, wherein the threat is unauthorized use of the system reflecting an interest of a violator, an element by which the kind of threat is realized, a method of realizing the threat by the element, or a vector of action on the system to carry out a method of realizing the threat.

14. The system of claim 11, wherein the kinds of use of the system reflect one of:
only an interest of a violator;
an interest of both a violator and an authorized user, yet realized by each of the interested parties in different ways; or
an interest of both a violator and an authorized user and realized in similar ways, wherein the authorization is by a password and where the password is obtained by the violator using a different method from the method used by the authorized user.

15. The system of claim 14, wherein the kinds of use of the system reflecting an interest of an authorized user and a method for realizing that kind of use meet requirements of functional safety.

16. The system of claim 11, wherein the components of the system are vulnerable to one or more of:
a kind of unauthorized use of the system,
a method of realizing a threat, for a kind of use of the system, which reflects the interests of both a violator and an authorized user, yet which is realized by each of the interested parties by different methods, and
a vector of action on the system, which is used to implement a method of realizing a threat, for a kind of use of the system, that reflects the interest of both a violator and an authorized user, wherein the interest of both the violator and the authorized user are realized by a same method of realizing the threat, wherein the method of realizing the threat is defined by an attack vector.

17. The system of claim 16, wherein a component of the system is vulnerable to a kind of use when it does not limit the indicated kind of unauthorized use of the system,
wherein the component is recognized as being vulnerable to the indicated method of realizing a threat if it does not limit the indicated method of realizing a threat, and
wherein the component is recognized as being vulnerable to the indicated vector of action on the system if it does not limit the indicated vector of action on the system.

18. The system of claim 17, wherein impossibility of limiting the kind of use, the indicated method of realizing the threat, or the indicated vector of action, is dictated by functional capabilities of configuration of the components realizing elements of the system being tested.

19. The system of claim 16, wherein the hardware processor is further configured to:
select hardware and software components, by a selection module of the CAD, based on the comparison of the use model and the threat model, for realization of the system elements to limit the kind of unauthorized use of the system, and to limit the method of realizing a threat, and to limit the vector of action on the system.

20. The system of claim 11, wherein the formalized architecture description is produced in accordance with international standards and further contains at least: interests of authorized users with respect to the system.

21. A non-transitory computer-readable medium, storing instructions thereon for automated testing of a system of hardware and software, the instructions comprising:
receiving a formalized architecture description describing an architecture of a system being designed;

receiving a formalized threat description describing threats to systems similar to the system being designed based on comparisons of purposes or goals for which the systems are designed;

building a use model based on the formalized architecture description;

building a threat model based on the formalized threat description;

determining kinds of use of the system by comparing the threat model to the use model; and determining components of the system which are vulnerable to each of the kinds of use.

\* \* \* \* \*